US006807569B1

(12) United States Patent
Bhimani et al.

(10) Patent No.: US 6,807,569 B1
(45) Date of Patent: Oct. 19, 2004

(54) TRUSTED AND ANONYMOUS SYSTEM AND METHOD FOR SHARING THREAT DATA TO INDUSTRY ASSETS

(75) Inventors: Anish Bhimani, Pawtucket, RI (US);
William Marlow, Herndon, VA (US);
Errol Weiss, Clarksville, MD (US);
Francis W. Schugar, Silver Spring, MD (US)

(73) Assignee: Science Applications International Corporation, San Diego, CA (US)

( * ) Notice: Subject to any disclaimer, the term of this patent is extended or adjusted under 35 U.S.C. 154(b) by 742 days.

(21) Appl. No.: 09/662,569

(22) Filed: Sep. 15, 2000

Related U.S. Application Data

(60) Provisional application No. 60/232,004, filed on Sep. 12, 2000.

(51) Int. Cl.[7] .............................................. G06F 15/16
(52) U.S. Cl. ........................ 709/217; 709/218; 709/219; 705/8; 705/44; 705/64; 705/78; 713/200
(58) Field of Search ................................ 709/217–219, 709/206; 705/8, 44, 64, 78; 713/200

(56) References Cited

U.S. PATENT DOCUMENTS

| 3,956,615 | A | | 5/1976 | Anderson et al. | |
|---|---|---|---|---|---|
| 5,414,833 | A | | 5/1995 | Hershey et al. | |
| 5,799,317 | A | * | 8/1998 | He et al. ................. | 707/104.1 |
| 5,862,325 | A | * | 1/1999 | Reed et al. ................. | 709/201 |
| 6,088,796 | A | | 7/2000 | Cianfrocca et al. | |
| 6,182,226 | B1 | | 1/2001 | Reid et al. | |
| 2002/0038430 | A1 | * | 3/2002 | Edwards et al. ............ | 713/200 |
| 2002/0095381 | A1 | * | 7/2002 | Takahashi et al. ............ | 705/44 |
| 2002/0107927 | A1 | * | 8/2002 | Gallant ........................ | 709/206 |
| 2002/0120310 | A1 | * | 8/2002 | Linden et al. ................ | 607/60 |
| 2003/0004774 | A1 | * | 1/2003 | Greene et al. ................. | 705/8 |
| 2003/0120615 | A1 | * | 6/2003 | Kuo ........................... | 705/78 |

OTHER PUBLICATIONS

International Search Report for Application No. PCT/US01/28077, dated Dec. 5, 2001 (mailing date).
Preliminary Examination Report for Application No. PCT/US01/28077, dated Jul. 10, 2002 (mailing date).

* cited by examiner

*Primary Examiner*—Nabil El-hady
(74) *Attorney, Agent, or Firm*—Kilpatrick Stockton LLP

(57) ABSTRACT

A system and method serves to anonymously share information about security incidents and vulnerability in corporate and national information infrastructures. The method and system provides for submitting information and categorizing the corresponding data in a secure manner in which the submitting party's anonymity is ensured. A secure facility such as a data center is established that provides for authenticated and, where appropriate, anonymous input, ensuring availability of information associated with threats to industry assets and the available resolutions or solutions. The information may be shared securely through, for example, the World Wide Web, between authorized organizations.

19 Claims, 15 Drawing Sheets

Enrollment Process

FIG. 5

```
┌─────────────────────────────────────────────────────┐
│ ✻FS/  - Netscape                           _ □ ✕   │
│ File Edit View Go Communicator Help                 │
├─────────────────────────────────────────────────────┤
│                                                     │
│ Basic Submittal Information                         │
│                                                     │
│ Please enter all the following information:         │
│                                                     │
│ Submittal Type:       [Incident ▼]                  │
│                                                     │
│ Severity:             [Normal ▼]                    │
│                                                     │
│ Industry Type:        [Bank ▼]                      │
│                                                     │
│ Date / Time Detected: [09▼]/[27▼]/[1999▼] [03▼]:[35▼]│
│ (mm/dd/yyyy hh:mm) GMT                              │
│                                                     │
│ Date / Time of Event: [09▼]/[27▼]/[1999▼] [03▼]:[35▼]│
│ (mm/dd/yyyy hh:mm) GMT                              │
│                                                     │
│ Duration of Event:    [1]                           │
│ (number of days)                                    │
│                                                     │
│ [Submit]                                            │
│                                                     │
│ Return to Submission Main Page                      │
│                                                     │
├─────────────────────────────────────────────────────┤
│         Document Done                               │
└─────────────────────────────────────────────────────┘
```

FIG. 7

|  |  |
|---|---|
| | ☐ Field Office (branch) ☐ Independent Trust Agent |
| How Detected? | ⊙ Monitoring ▼  ○ Other: [____] |
| Suspected Source/Cause: | Internal ▼ |
| Exposure/Damage:<br>☐ *(1,200 chars max)*<br>*check box to auto-limit* | [text area] |
| First Known Occurence? | ○ Yes ⊙ No |
| Unauthorized Activity? | ○ Yes ⊙ No |
| Intent to Cause Disruption? | ○ Yes ⊙ No |
| Intent: | Malicious ▼ |
| Special Circumstances:<br>☐ *(1,200 chars max)*<br>*check box to auto-limit* | [text area] |

[Submit]

Return to the Submission Main Page

FIG. 11

```
╔════════════════════════════════════════════════════════╗
║ ※ FS/ - Netscape                              _ □ ☒    ║
╠════════════════════════════════════════════════════════╣
║ File Edit View Go Communicator Help                    ║
╠════════════════════════════════════════════════════════╣
```

Systems Affected
  Please enter all the following information.
  Select as many systems that apply:
  Hardware:    ☐ 88286 Clone ☐ AS400 ☐ Cisco 7000 Router
               ☐ Cisco Routers ☐ Compaq Server ☐ Dell 1300 ☐ Dell Server
               ☐ Gateway Server ☐ HP 9000 ☐ HP Server ☐ IBM 3090
               ☐ IBM 9672 ☐ IBM Server ☐ IBM ThinkPad ☐ IMac
               ☐ MIPS Processor ☐ Other Server ☐ PDP-11 ☐ PIII ☐ SGI
               ☐ Stratus ☐ SUN 5 ☐ Sun Server ☐ Wellfleet Router
  Operating    ☐ FreeBSD ☐ Linux ☐ MVS ☐ OS/390 ☐ Soleris
  Systems:     ☐ Windows 2000 ☐ Windows 3.11 ☐ Windows 95
               ☐ Windows 98 ☐ Windows NT
  Platforms:   ☐ IBM ☐ Intel ☐ Macintosh ☐ PC ☐ Sun
  Applications: ☐ Administration ☐ Cross Border Payment
                ☐ Customer Profiles ☐ EFT ☐ Internet Banking
                ☐ Internet Trading ☐ SQL Server ☐ Test/Development ☐ Web
  Other System ☐ Back Office Support ☐ Book Entry ☐ eee
  Software:    ☐ Main Processing ☐ MS Access ☐ MS Word Other Systems
Affected:
☐ *(2,500 chars
max) check
box to auto-limit*

Impact on IT:
☐ *(1,200 chars
max) check
box to auto-limit*

Impact on
Business
Information:
☐ *(2,500 chars
max) check
box to auto-limit*

Accuracy of    [Accurate  ▼]
Information:

[Submit]

Return to the Submission Main Page

FIG. 12

Non-anonymous Information (Optional)
currently not being stored

*The following information is optional and can be skipped:*

Corporate Information Security Notified? Yes ⊙ No ○

- Notification Date/Time: (mm/dd/yyyy hh:mm:ss)
- Report Manager:
- Report Manager Phone Number:
- Information Security Officer:
- Information Security Officer Phone Number:
- Company:
- Location:
- Country:
- Time of Call: (mm/dd/yyyy hh:mm:ss)
- Caller Name:
- Caller Phone Number:
- Caller Email Address:
- Best Time to Contact:
- Title / Position / Shift:
- Department:
- Mail Code:
- Manager:
- Names of Others Involved: (500 chars max)
- Phone Numbers of Others Involved: (200 chars max)

[Submit]

FIG. 13

```
※FS/ - Netscape                                              □☐⊠
File Edit View Go Communicator Help
```

Review Submittal Information
  Non-anonymous information (optional)
  *Please review all of the following information,*
  *and click on the field name to edit a field.*

| | |
|---|---|
| Submittal Type: | Incident |
| Severity: | Normal |
| Industry Type: | Bank |
| Date / Time Detected: | 09/27/1999 03:40 GMT |
| Date / Time of Event: | 09/27/1999 03:40 GMT |
| Duration of Event: | 1 days |
| Event Subject: | |
| Event Summary: | |
| Detailed Description: | |
| Business Area Event Occurred: | |
| How Detected? | Monitoring |
| Suspected Source/Cause: | Internal |
| Exposure / Damage: | |
| First Known Occurence? | No |
| Unauthorized Activity? | No |
| Intent to Cause Disruption? | No |
| Intent: | Malicious |
| Special Circumstances: | |
| Who Handled the Event? | |
| Actions Taken According to Plan? | Yes |
| Actions Taken? | |
| Confidence Action Taken Will Avoid Similar Events: | Confident |
| Recommendations: | |

Document Done

FIG. 14

```
░FS/   - Netscape                                      _ □⊡☒
File Edit View Go Communicator Help
```

Corrective Action:
Improvements Made:
Investigations and
Weaknesses Identified /
Improvements Suggested:
Lessons Learned:
Categories:

Other Categories:

Hardware:
Operating Systems:
Platforms:
Applications:
Other System Software:
Other Systems Affected:
Impact on IT:
Impact on Business
Information:
Accuracy of Information:   Accurate

[Submit]

Return to the Submission Main Page

US 6,807,569 B1

TRUSTED AND ANONYMOUS SYSTEM AND METHOD FOR SHARING THREAT DATA TO INDUSTRY ASSETS

CROSS REFERENCE TO RELATED APPLICATIONS

This application is related to provisional application Ser. No. 60/232,004 filed Sep. 12, 2000, and entitled Information Sharing and Analysis System and Method of the same inventors herein, and to which priority is claimed. The disclosure of that provisional application is specifically incorporated by reference herein.

FIELD OF THE INVENTION

The invention relates to a method and system of creating and maintaining a database for providing authenticated and anonymous sharing of information associated with threats to industry assets, and available resolutions or solutions to such threats on industry and national information infrastructures.

BACKGROUND OF THE INVENTION

With the expansion of the global computer network known as the Internet, and an increase in business, commonly known as electronic business, conducted on the global computer network, security risks to such businesses and the related information infrastructure have become much more common in recent years. Specific risks involve potential liability related to invasion of privacy, copyright and trademark infringement, as well as attacks, implantation or spread of a computer virus, programming errors, information theft, fraud, security breaches, and other perils associated with electronic data.

The global computer network known as the Internet has opened extensive opportunities for financial services firms to connect critical business systems and create virtual businesses online. However, as noted, with the evolution of these businesses, there is an increased risk.

Not only are computer viruses a problem, but direct attacks on web sites have also become more common. Specifically, it has become common for hackers or unauthorized users to change the content of a web page and/or make other more damaging changes to such web pages.

SUMMARY OF THE INVENTION

Accordingly, there has been a need to provide a trusted yet anonymous method for sharing information about security incidents and vulnerabilities in such systems. A problem with such sharing of information, however, is that people are unwilling to report information about vulnerabilities for, among other reasons, fear of publicity that casts them in a negative light. As a result, there has to date not been available a good comprehensive database of data, and method and system of accessing data, concerning threats and evolutions of threats used to exploit vulnerabilities in the systems.

In accordance with the system and method of the invention, the problems of the absence of such a method and system are avoided by providing a trusted and anonymous system and method for sharing information about security incidents and vulnerabilities.

More specifically, in accordance with the invention, there is provided a system and method for anonymously sharing information about security incidents and vulnerability in corporate and national information infrastructures. Specifically, the method and system provide a means for submitting information and categorizing the corresponding data in a secure manner in which the submitting party's anonymity is ensured.

In one aspect, the invention broadly involves a method for allowing sharing of information associated with threats to industry assets. By "threats" to industry assets is meant such things as: (1) anything that breaches the security of a company and its computer systems such as new viruses, "spoofing," "break-ins", defacements, etc. ("Incident Data"); (2) known technical vulnerabilities in products, systems or software ("Vulnerability Data"); (3) known information about groups or individuals who are actively posing an electronic threat to systems ("Threat Activity Data"); and (4) data made up of controlled early notification from vendors of discovered "holes," problems, vulnerabilities and the downloaded or downloadable "fixes," if available ("Vendor Data"). As it relates to the identified "threats," "Incident Resolution Data" shall mean known fixes or processes that correct the problems submitted. Of course, as will be readily apparent to those of ordinary skill in the art, other "threats" can eventually arise and be included among the specific threats enumerated, and dealt with within the method and system described.

The method thus will involve establishing a secured database which is made up of threat data, preferably in specifically classified form. Predetermined entities will be allowed access to the database to uncover information about threats. The database is augmented over time with additional threat data received from at least one of a plurality of sources. After the database is augmented, at least some of the predetermined entities are notified of additional threat data received which has been augmented to the database, whereby the predetermined entities will know to access the database if it is desired to learn more about the additional threat data.

From a system perspective, a data center is established which includes a secured database containing threat data stored thereon. A communications interface serves to allow predetermined entities access to the database, and a temporary database, separate or as part of and segmented from the secured database, is established for storing additional threat data received from at least one of a plurality of sources to allow review and classification of the additional threat data. The secured database is connected to the temporary database, either as a segmented part thereof, or as a separate database, for allowing the additional threat data to be stored on the secured database once it has been reviewed and classified. An electronic notification system serves to notify at least some of the predetermined entities about additional threat data stored on the secured database so that the predetermined entities will know to access the secured database if the additional threat data stored thereon is of interest.

More specifically, a secure facility, i.e., a data center, is established that provides for authenticated and, where appropriate, anonymous input and sharing of information associated with threats to industry assets and the available resolutions or solutions. The information may be shared securely through, for example, the World Wide Web, between authorized organizations who are oftentimes competitors, in an open and anonymous form. The database may be augmented by information provided by government and vendor sources.

Enrolled participants are provided the capability of anonymously submitting information to the database. Information then becomes available through secure, encrypted web-based connections. A team of analysts and security professionals assess each submittal regardless of the seriousness of the vulnerability or attack to identify patterns. As appropriate, end users/participants are then notified by electronic page and/or e-mail, or other means, that an urgent or crisis situation exists, and are advised how to obtain additional information. Optionally, a user profile allows filtering of notifications so those participants receive notification only when a relevant issue arises.

BRIEF DESCRIPTION OF THE DRAWING

Having generally described the invention in summary form, the same will become more clearly understood from the following detailed discussion, and appended documents discussed with reference to the appended Figures wherein:

FIG. 5 is a screen shot illustrating how a participant is prompted to submit basic submittal information concerning additional threats;

FIGS. 6 and 7 illustrate screen prompts allowing a participant to enter detailed event information concerning additional threats;

FIG. 11 is a screen shot illustrating how a participant is prompted to provide information about the types of systems affected by threats;

FIG. 12 is a screen shot allowing a participant to provide identifying information about the participant in the event that the submission is to be treated as non-anonymous concerning the threats;

FIGS. 13 and 14 are screen shots showing information entered by the participant to allow the participant to verify, edit and/or confirm the threat information submitted.

DETAILED DISCUSSION OF THE INVENTION

In accordance with the system and method herein there is established an information collection, such as at a data center, which includes a database having data stored thereon in a classified manner about security threats and resolutions or solutions to security threats in the information infrastructures in industry and the government. The database is created and expanded through submissions by participants who interface with the system.

Figure 1:
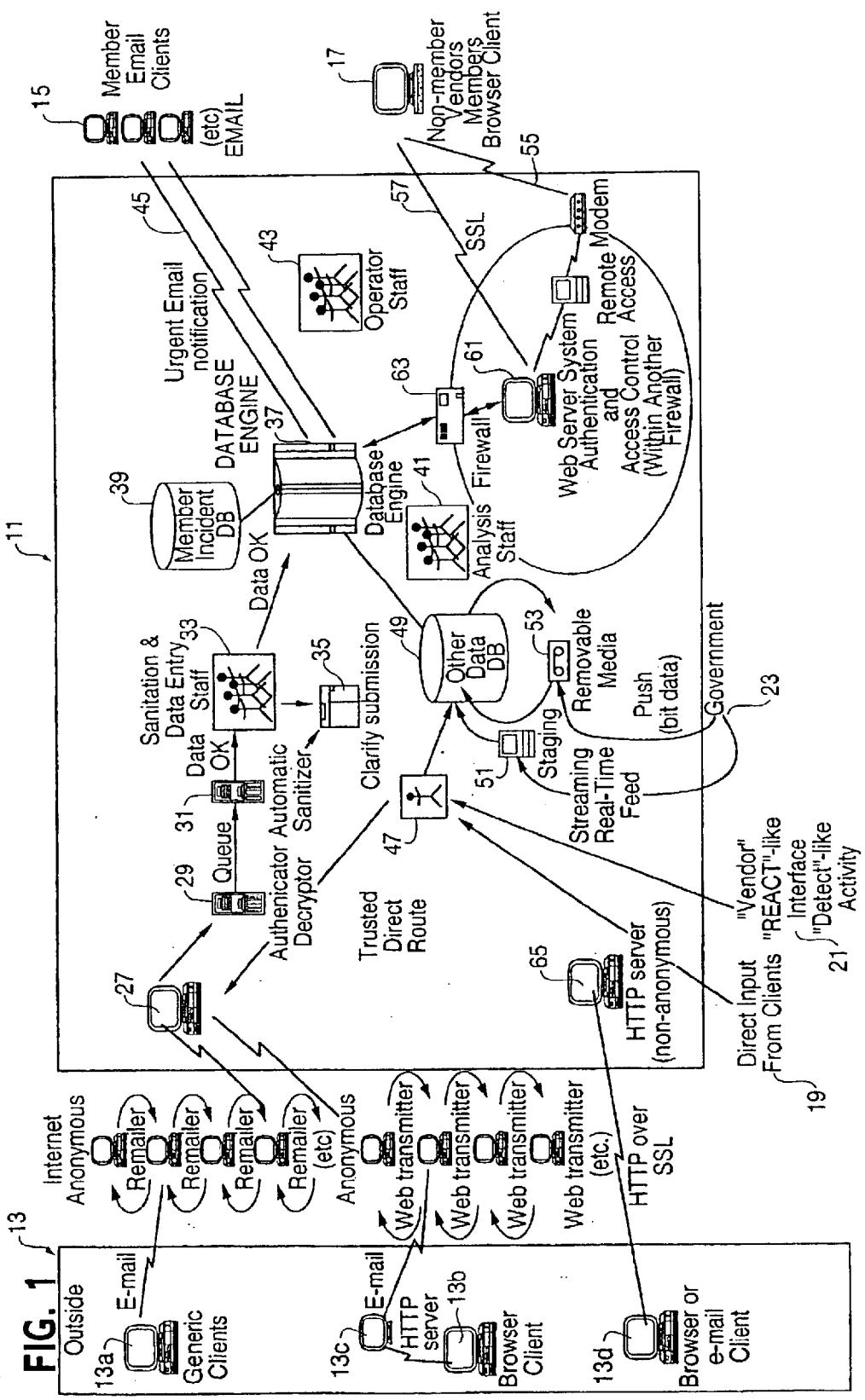
FIG. 1 is an overview schematic diagram of a typical example of the system topology and method of operation as connected through a data center in accordance with the system and method herein.

As shown in FIG. 1, on the left side of FIG. 1 are shown a number of anonymous re-mailers, which may be provided, for example, by third-party service providers, to allow participants who subscribe to the service provided by the system and method herein to anonymously submit threat data to a data center 11. Connected to the re-mailers are the participants 13 in the system who are, for example, direct e-mail clients 13a, browser clients 13b in communication through an HTTP server 13c, or connected non-anonymously as a browser or e-mail client 13d. Once a party chooses to become a member or participant in the system and method, either through custom software or commercially available software available from, for example, commercial entities such as FreedomNet, they are given a password and an ID that allows them to sign on to data center 11 through the Web. Other forms of authentication techniques such as digital certificates, tokens, and/or other credentials, can be implemented as an alternative as will be readily apparent to those of ordinary skill in the art.

Accordingly, information about a threat, vulnerability, etc. may be submitted from the participant through anonymous re-mailers or web transmitters on the Internet, such as the service provided by FreedomNet, or a number of others services currently commercially available.

Anonymous information about "threats" or additional "threats" is received at a server 27, for example, an SMTP server or an HTTP passed to an authenticator/decryptor 29, and thereafter passed to an automatic sanitizer 31 in which software sanitizes the message by actions such as removing company name, any kind of address, any kind of identifying material or information which might accidentally identify the source of the data. A keyword search may be done on specific things that would either identify the person or the entity, also including such things as trademarks, based on a list of information previously provided by the participant or member. Thereafter the information and message is passed to an analyst who is part of a sanitation and data entry staff 33.

The analyst in the sanitation and data entry staff 33 will receive a page of information and will obtain a tracking ID. The analyst then reviews the entire submission to ensure again that there is no data that links to an actual participant. The analyst also ensures that all necessary fields are filled out to ensure that a proper analysis can be conducted. The analyst then will search the analysis database for example, at a member incident database 39 which is controlled by the database engine 37, will classify the submission in accordance with a predetermined taxonomy, for example, for type, severity level, etc., and will add any additional information, such as lessons learned, or recommendations, and then add it to the member incident database 39.

Once the additional information is added to the database 39, through software control, all members or participants, if it is an emergency situation, are notified through an electronic notification system, for example, paging, e-mail paging, telephone, fax, and/or just regular e-mail. For example, urgent e-mail notification can be initiated by operator staff 43 for transmission through the electronic notification system which may include an e-mail connection for notification 45 to participant or member e-mail locations 15. The participants or members can then through a communications interface such as conventional direct modem or browser connections log into the database 39. This is done through look-up of a tracking ID that the participant has been given, and the participant is then allowed to review the analysis or review the submission.

It will be appreciated from the diagram that there is more than one way that data is input into the database. As previously discussed, it may be submitted by the members or participants. Alternatively, the data center may also include a second database store 49 for other data which is received from alternative sources, such as the government 23, a vendor 21, or an associated service of the company running the data center. In addition, participants can provide the information as a direct input 19 from clients to an analyst 47 who then enters it into the other database 49 for temporary storage for analysis and classification by analysis staff 41 for eventual storage through the database engine 37 into the database 39. Alternatively, if more appropriate, the analyst 47 can send the threat data to the server 27 for eventual classification by the sanitization and data entry staff 33. Similarly, a vendor 21 can provide the information directly to an analyst 47 for handling in a like manner. For government 23 submissions, they can be provided in the form of removable media 53 for entry through input device 51 into the other data database 49 or directly to the input device 51 as a real time feed, and handled by analysis staff 41 as described previously.

On the submission side, participants can also submit "threat" data nonanonymously, for example, from a browser or e-mail client terminal 13d through an SSL connection to a non-anonymous HTTP server 65 in the data center 11 for eventual classification and entry into the member incident database 39.

If vendors become participants, they are also accorded the full privileges of participants in terms of accessing the database. On the other hand, if they are not participants, their role may be limited to merely submitting threat data for notification to the members/participants.

In terms of the sanitizing operation, data that is incomplete will be stored and identified as data requiring clarification. Such data may turn out not to be a valid submission or missing data. In this case, the submission is held in storage unit 35, the members or participants are notified with the ID number for the submission indicating the defects in the data, and when additional data is received, then the complete package of data is processed by the analyst from the sanitization and data entry staff 33.

It will also be appreciated that an analyst reviewing data being submitted either from the participants/members or from other sources, will be analyzing the data, classifying it in terms of urgency, nature of threat, etc., and correlating it to information already existing on the database. Such data can be classified as "crisis threat" data, "urgent threat" data, or "awareness" data as described hereafter.

Once the data is classified and added to the database, the members/participants are notified in a number of different ways. Typically, only "crisis threat" data and "urgent threat" data notification is provided. The participants do not receive the entire message in the initial notification, and instead receive an indication that there is a new submission, and an indication of the subject matter. The member or participant can then access the system, for example, through a browser 17 interface to the database. Access is controlled through a fairly standard security model, as described previously. The member or participant is then provided access to the details about the information they were notified about.

In accordance with the system, a participant/member is also able to customize their profile, specifying the types of threats they want to be notified about. The customization can include customizing the contact information in a conventional manner, as well as customizing what sort of data the member/participant wishes to receive. This information may be kept as a separate participant database in the member incident database 39, which is a secured database, i.e., access is controlled as described herein, and used by operator staff 43 with the database engine 37 control the notification described.

It should be noted that in submitting the data, the participant has the ability to pre-classify, for example, by providing a score related to the nature of the threat. The analysts, however, have the authority to override the classification.

Figure 2:
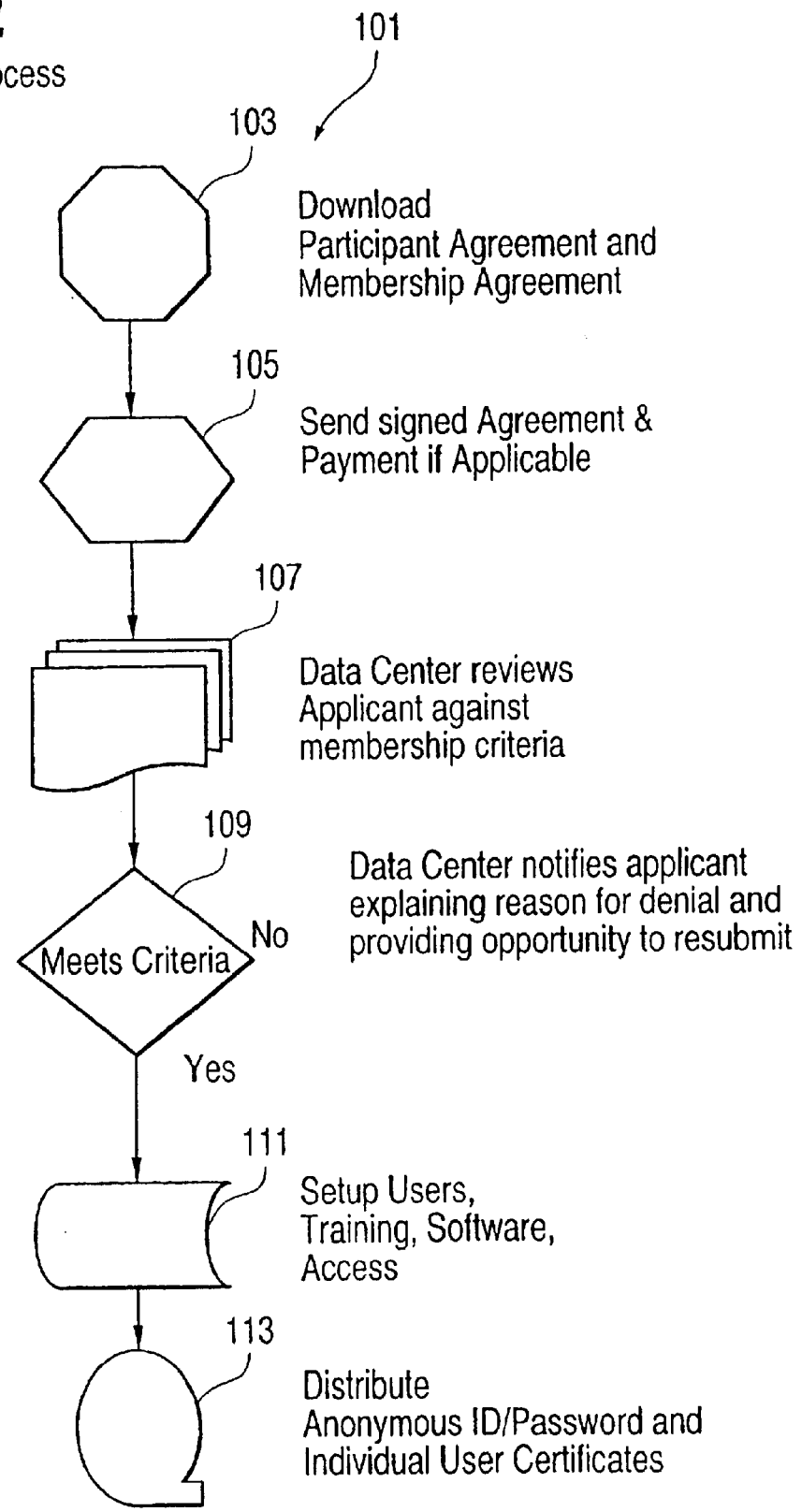
FIG. 2 is a flow chart showing how a participant would subscribe and enroll to be allowed access to the database implemented in the system and method described herein.

FIG. 2 shows a flow chart 101 illustrating the enrollment process for participants to be allowed access to the database 39, and to allow submission of threat data anonymously. The flow chart 101 commences at a first step 103 wherein an applicant can download, for example, at a browser system 17, a participant and membership agreement. Once downloaded, the applicant can send a signed agreement and payment, if applicable, at a step 105. At step 107 data center 11 staff reviews the applicant information against established membership criteria and a determination is made at step 109 as to whether the applicant meets the membership criteria. If the answer is "no," the data center notifies the applicant, explaining the reason for denial and providing an opportunity to resubmit. If the answer is "yes," then at a step 111, the participant profiles are set up, and training, software and access are then provided. At step 113 an anonymous ID/password and individual user certificates to provide authentication are then distributed to the participant.

In a preferred implementation, enrollment of participants is limited to commercial entities that satisfy certain membership standards established by the data center 11 in its discretion. The system previously described as implemented through the data center 11 allows the sharing of information in an authenticated and anonymous private manner for the previously-described threats. In the event anonymity is not a concern, participants may choose to have information attributed to them.

While threat information can be provided from a participant's own experience, it can also be contributed from publicly available information, as well as participants submitting anonymously and other reliable sources, such as vendors and government entities.

In the case of anonymous information, while part of the functionality provided by the data center 11 includes a sanitizing function to attempt to "scrub" identifying information, participants are solely responsible for ensuring that submissions intended to be anonymous do not contain identifying information. Notwithstanding this, as previously described, the information undergoes a two-step process of sanitizing with an automatic sanitizer 31 to attempt to remove references that would allow the attribution of the information to specific entities. As previously discussed, the first step is an automated process at automatic sanitizer 31 of keyword search and removal. The second step is a manual review of the submitted information by an analyst from the sanitization and data entry staff 33.

Upon acceptance of an applicant as a participant, individual accounts are established for each participant. Authentication accounts which may be implemented include individual user certificates, one-time password tokens, and anonymous accounts.

Individual user certificates may issued to end users of the participants. The end users are not anonymous. They are allocated to the specific end user and are tracked and monitored for use. These certificates will allow access to the data center 11 databases, and search engines which are provided as functionality for searching the databases.

One-time password tokens are issued to end users of the participants and are similarly not anonymous. They are allocated to a specific end user and are tracked and monitored for use. The tokens allow for access to the database and search engines, and support the attributed submission of information to the data center 11 as well as all look-up functions.

Anonymous accounts consist of an account ID and password issued to an end user of a participant for use in transmitting anonymous submissions of information to the data center 11. The account ID and password combinations can only be used for such submissions. They do not allow access to other data center 11 information. For example, each participant may be provided a specific number of anonymous ID/passwords. Such passwords may be sent, for example, through private carrier to the designated contact for the participant.

In the case of issuing of anonymous accounts, no record of the allocation of anonymous accounts will be available from the data center 11 since they are generated randomly and issued randomly. In the event of the need to delete ID/passwords, a broadcast message can be sent to all participants with the ID of the anonymous account that needs to be deleted. The revoked ID/password will no longer be accepted by the data center 11.

Turning to the specific technical requirements for access or submittal to the data center 11, the only required software for access or submittal is anonymous submission software which will be provided by the data center 11 or a third party, along with a standard Internet browser. Accessing the anonymous submittal systems can be done conventionally, for example, through a Microsoft Windows 95, 98, NT or 2000 system, and may require the use of a separate dial-up connection to an independent service provider depending on the internal configuration of a participant's network. As will be appreciated, as access software may be upgraded, the upgrades may be posted to the data center 11 web site and available for secure download.

As already illustrated in FIG. 1, non-anonymous submissions may be accepted by e-mail and web, such as from a browser or e-mail client 13d, or alternatively as a direct input 19 from participants by fax or telephone. Anonymous submissions may be accepted by web or e-mail through a direct e-mail system 13 or through a browser client 13b. For a web-based submission, a participant may log into the submittal page at the server 27 using the anonymous ID/passwords provided. The participant may then fill out the reporting page and submit it for analysis. Similarly, for e-mail-based submissions, the participant may rely on anonymous remailer software which has been provided to the participant, and will send an e-mail of the data to the data center 11.

Figure 3:
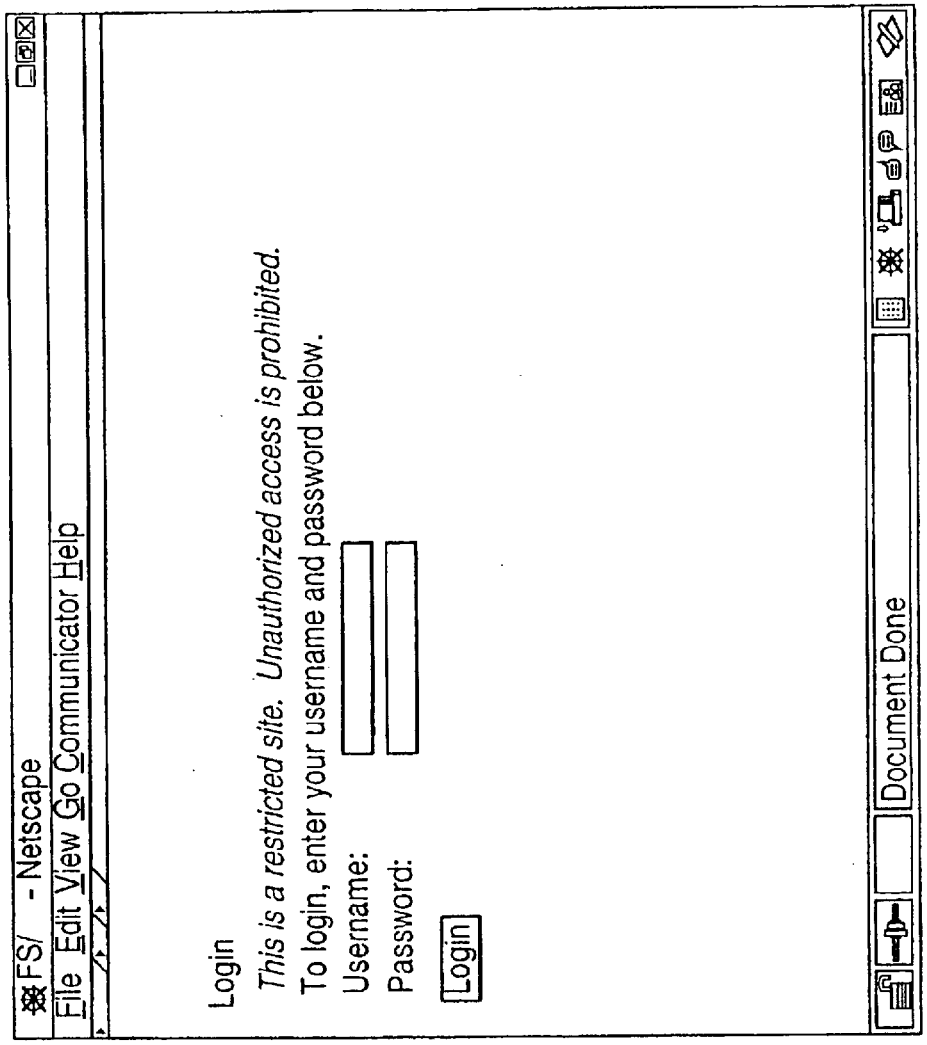
FIG. 3 illustrates an initial screen to allow a participant access to the database and to submit, either anonymously, or not anonymously, additional threat data.
Figure 4:
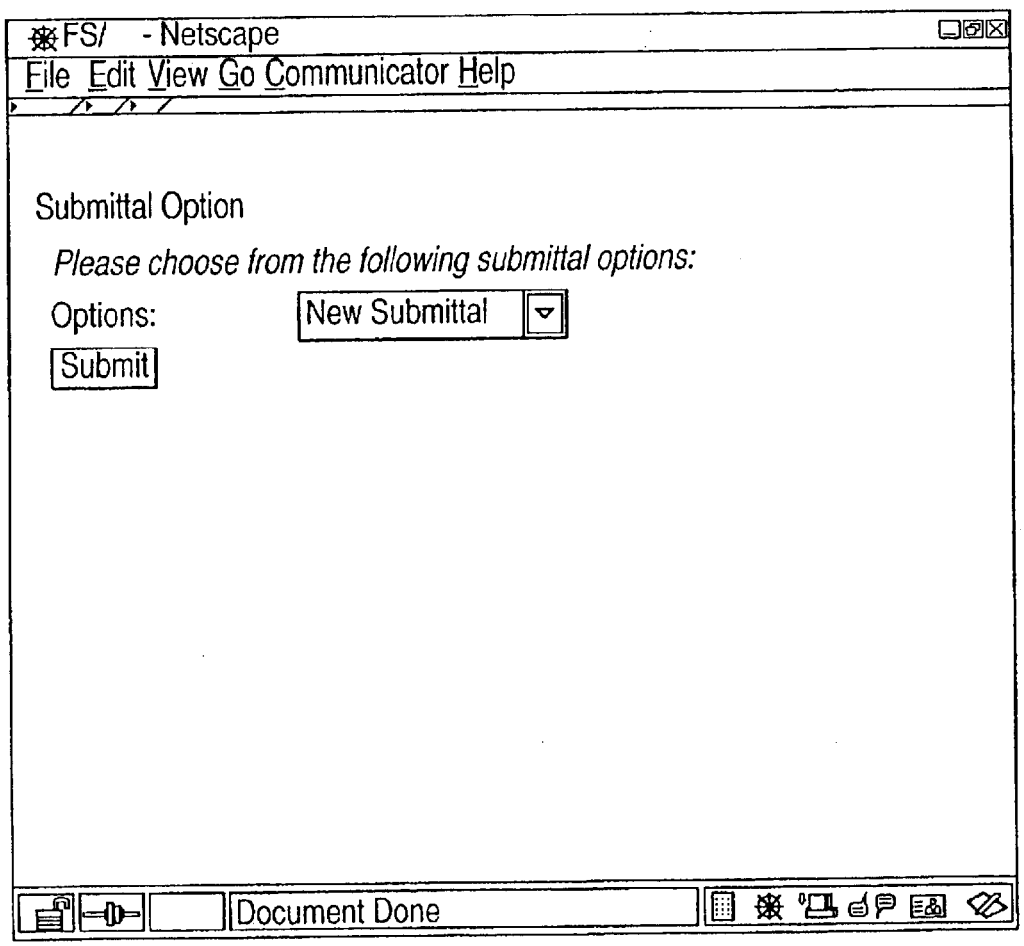
FIG. 4 is a screen shot illustrating how a participant would be provided submittal options after logging into the system.

By way of further clarification, FIG. 3 illustrates a typical login screen in which a participant is prompted to enter their user name and password. FIG. 4 illustrates a second screen once login is accomplished, which allows a participant to select a submittal option. FIG. 5 illustrates a typical basic information submittal screen in which a participant is prompted to provide basic information about the threat data to be submitted.

Figure 6:
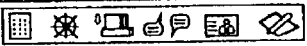
Figure 8:
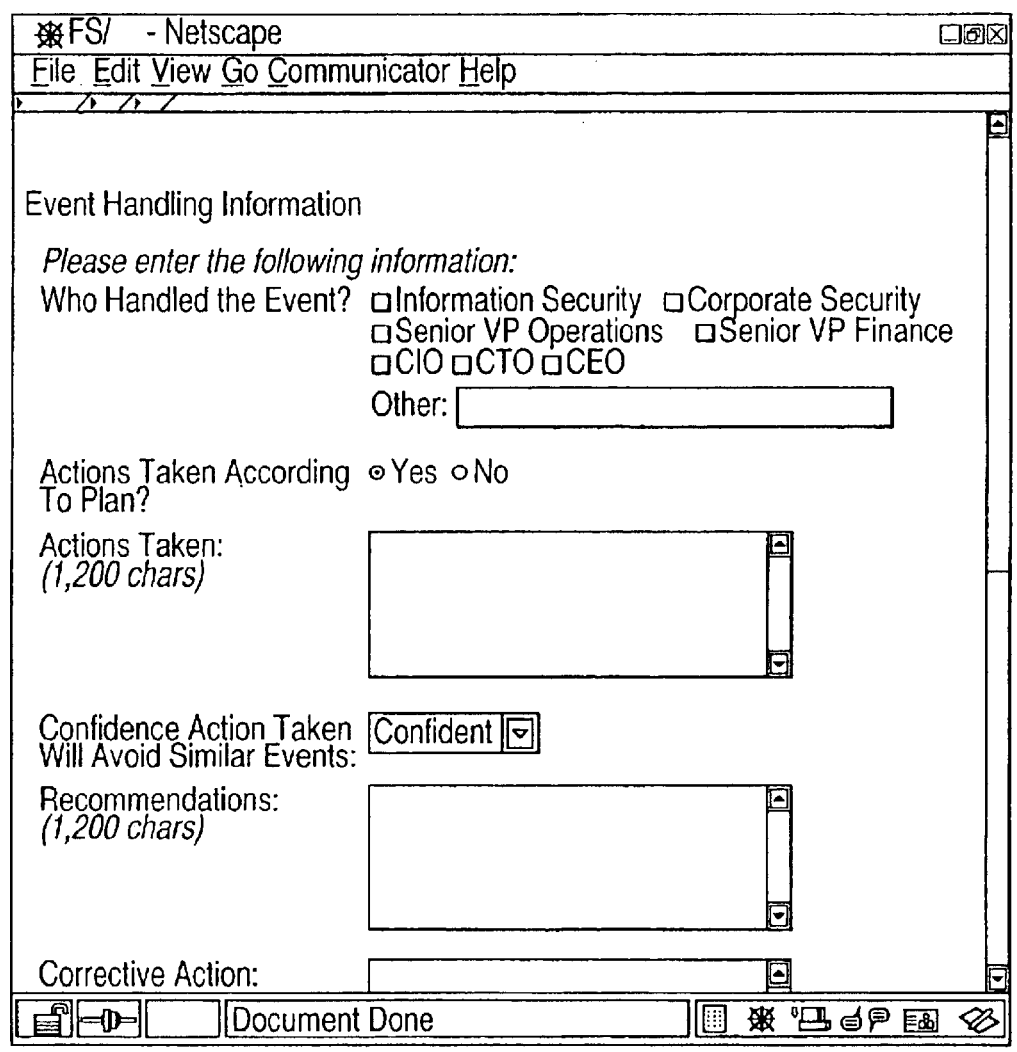
FIGS. 8 and 9 are screen shots illustrating how a participant is prompted to enter event handling information concerning additional threats.
Figure 9:
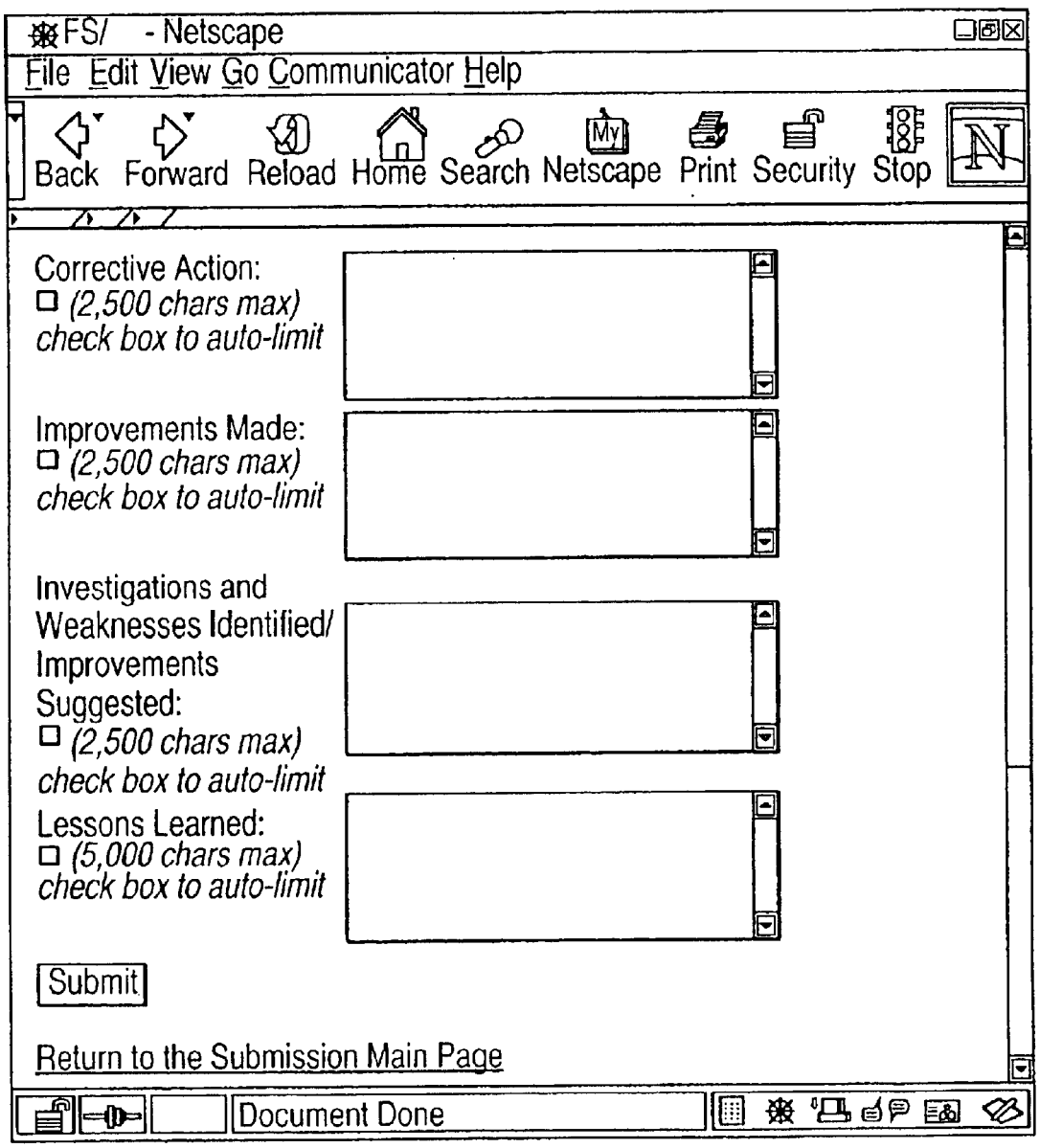

FIGS. 6 and 7 illustrate typical screens in which a participant can provide event detailed information, and FIGS. 8 and 9 illustrate how a participant may be prompted to enter detailed information about how they handled the event, or how the event was handled in the event of the third entity.

Figure 10:
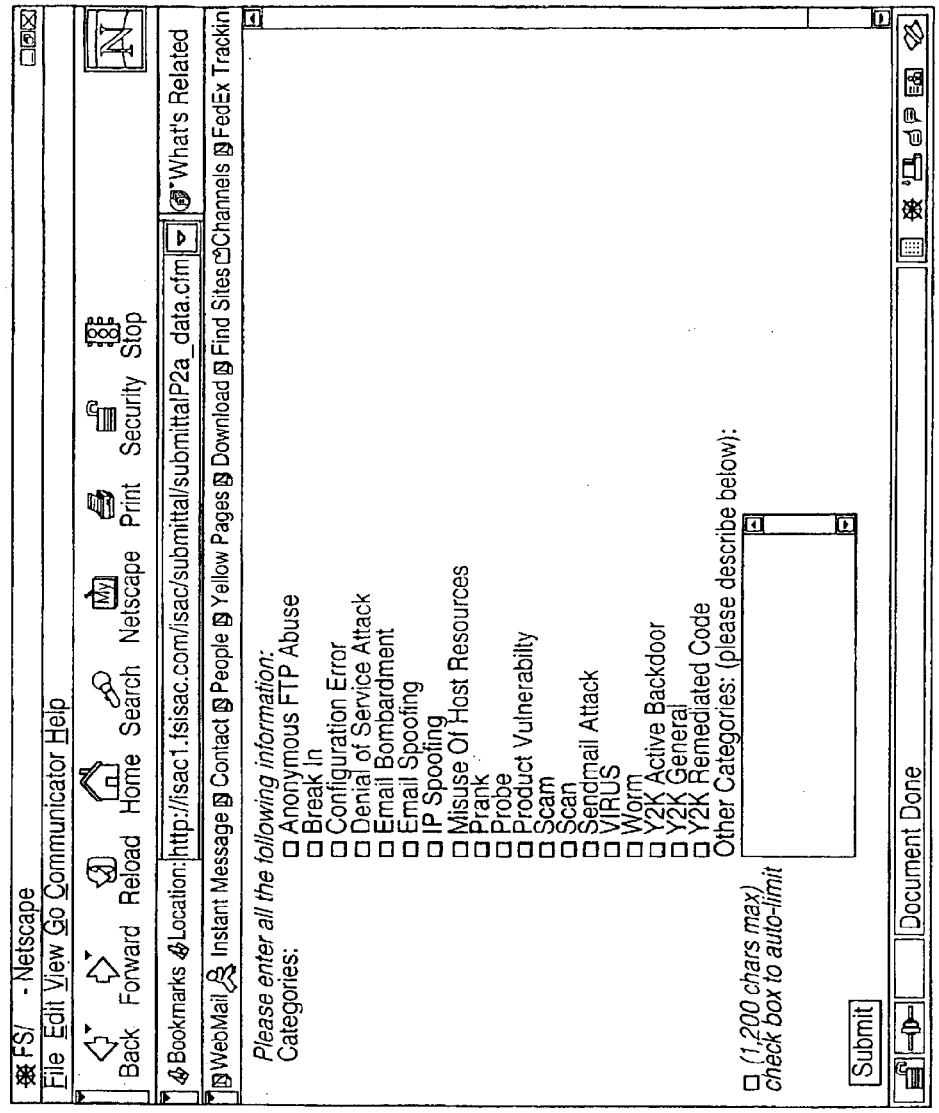
FIG. 10 is a screen shot illustrating how a participant is prompted to categorize the additional threat information.

FIG. 10 illustrates how a participant may be prompted to characterize the information, and FIG. 11 illustrates a prompt page to allow the participant to characterize the types of systems effected.

If the participant wishes to provide non-anonymous information, they are allowed to do so at a prompt screen page shown illustratively by FIG. 12, and the participant may then be allowed to review the submittal information and provide correction as necessary at a prompt confirming information page as illustrated in FIGS. 13 and 14.

Figure 15:
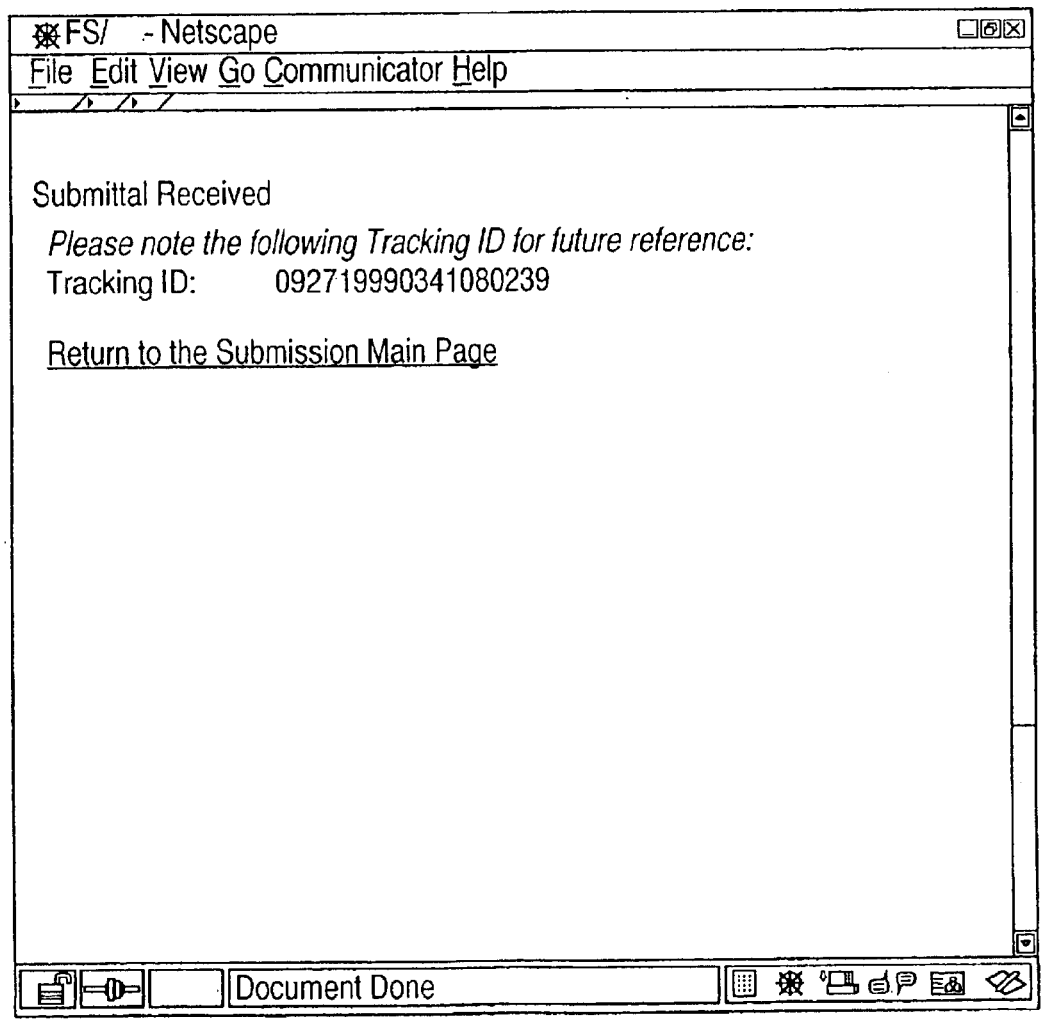
FIG. 15 is a screen shot providing to the participant a tracking identification number for future reference as it concerns the threat.

As a final step, the participant is provided a tracking ID number for future reference as illustrated by the prompt page shown in FIG. 15.

With respect to the submitted data, it is first kept in a sanitized database for review by an analyst prior to posting to the member incident database 39. All submitted information will be authenticated using one of a number of authenticating mechanisms, including, but not limited to, digital certificates and electronic signatures, one-time passwords and tokens, or other credentials, as previously discussed, in conjunction with anonymous ID and passwords, to ensure the data comes from an enrolled participant.

Turning to the specifics of the database 39 contents, they will include Incident Data, Incident Resolution Data, Vulnerability Data, Threat Activity Data, Vendor Data, and as applicable, solutions, downloads, government data, as well as other types of relevant data as becomes available as will be readily apparent to those of ordinary skill in the art. It may also include other types of data such as participant information and preferences in a separate section as previously discussed.

Incident Data, which has been previously defined, and as submitted by participants will be temporarily held in a separate system for initial review by analysts in the sanitization and data entry staff 33. Once analyzed and validated, the Incident Data will be made available in the database 39. Incident Data, as previously discussed, will be classified as to the nature of the severity. Categories of the severity for all threat data are "crisis threat," which means a major breach of security using previously unknown methods of attack; "urgent threat," which means a major breach of security using known methods of attack; and "awareness," which means notification of attack methodologies or unusual activity. As noted previously, in the case of "crisis threat" or "urgent threat" submittals, the data center 11 will electronically notify participants through pager, e-mail, or digital phone messaging to access the database 39 for secure information sharing.

In addition, resolutions to specific incidences, described previously as Incident Resolution Data, will be posted to the database 39. Participants are expected and encouraged to submit resolutions of incidences they report and such postings may be done anonymously. Submitted resolutions will not b& checked for technical accuracy by an analyst.

Vulnerability Data is a separate category and will include information regarding known vulnerabilities of products and systems that have been identified from various sources. The Threat Activity Data section of the database 39 will contain information on present and past threats to systems, networks, business, products and people. Similarly, this information will come from various sources.

The database 39 may also include a solutions category which will contain information on correcting vulnerabilities and addressing threats. The solutions can be categorized into two categories, such as technical solutions, and process/business solutions. Code, patches, and links to vendor and third-party support sites provide the ability to download selected information to assistants supporting participants.

While a specific topology for the system is shown in FIG. 1, it will be readily apparent that those of ordinary skill in the art may deploy the system and implement the method in alternative configurations. Similarly, participant access to the database and submission, both non-anonymous and anonymous, are shown for ease of understanding as being done on separate systems. As may be appreciated by those of ordinary skill in the art, a participant can accomplish all functions on a single machine appropriately configured for browser and e-mail access, either directly or through anonymizer services, and with appropriate software.

Having thus generally described the invention in detail, the same will become better understood from the appended claims in which it is described in a non-limiting manner.

What is claimed is:

1. A method for allowing sharing of information associated with threats to industry assets, comprises:

establishing a secured database comprised of threat data;

allowing predetermined entities access to said database;

augmenting the database with additional threat data received anonymously from at least one of a plurality of sources; and notifying at least some of said predetermined entities of additional threat data received and augmented to the database, whereby said predetermined entities will know to access the database if it is desired to learn more about the threat data wherein said threat data received anonymously is reviewed for specific information which may accidentally identify the source of the threat data, and said specific information is then removed from the threat data before augmenting the database.

2. The method of claim 1 wherein said threat data received anonymously is further reviewed by a process of key word search and removal, and for therefore transmitting the additional threat data for review and classification by an analyst.

3. The method of claim 1 wherein said predetermined entities are subscribed participants about which information is stored, and further comprising selectively notifying said participants in accordance with the type of additional threat data received and augmented to the database.

4. The method of claim 3 wherein said participants can selectively identify only specific types of threat data which has been augmented to the database about which they wish to be notified.

5. The method of claim 1 wherein said predetermined entities are subscribed participants about which information is stored, and said plurality of sources comprises said participants, and vendors and government sources.

6. The method of claim 1 wherein said threat data is comprised of and arranged in the database as, (a) incident data, (b) vulnerability data, (c) threat activity data, and (d) vendor data, and further comprising storing incident resolution data separately in the database.

7. The method of claim 6 further comprising, for threat data received from a participant, temporarily storing said submitted threat data in a separate sanitized database, removing source-identifying information from threat data received, authenticating said threat data through an authentication mechanism, and after sanitizing and authenticating, augmenting the secured database with said submitted threat data.

8. The method of claim 6 further comprising classifying the threat data in accordance with the nature of the threat data severity as: (a) crisis threat data; (b) urgent threat data; and (c) awareness threat data; and notifying participants in the case of crisis or urgent threat data is received and stored in the secured database.

9. The method of claim 8 wherein said notification of participants is done electronically.

10. A system for allowing sharing of information associated with threats to industry assets, comprising:

a data center comprised of a secured database containing threat data stored thereon;

a communications interface for allowing predetermined entities access to said database;

a temporary database store for storing additional threat data received anonymously from at least one of a plurality of sources for allowing review and classification of said additional threat data;

said secured database being connected to said temporary database store for allowing said additional threat data to be stored on the secured database once it has been reviewed and classified; and an electronic notification system for notifying at least some of said selected entities about additional threat data stored on the secured database, whereby said selected entities will know to access the secured database if the additional threat data stored thereon is of interest wherein said threat data received anonymously is reviewed for specific information which may accidentally identify the source of the threat data, and said specific information is then removed from the threat data before storing the threat data in the secured database.

11. The system of claim 10 further comprising an automated system for reviewing said additional threat data received anonymously by a process of key word search and removal, and for thereafter transmitting the additional threat data for review and classification by an analyst.

12. The system of claim 10 wherein said predetermined entities are subscribed participants, and further comprising a participant database comprised of participant information, including information about which type of additional threat data stored in the secured database each participant wishes to be notified about.

13. The system of claim 12 wherein the communications interface allows connection to third-party anonymizer systems to allow participants to submit additional threat data anonymously.

14. The system of claim 13 wherein said participant database contains authentication information about each participant to allow authentication of additional threat data received anonymously from participants.

15. The system of claim 10 wherein said predetermined entities are subscribed participants, and further comprising a participant database comprised of participant information, including information about which type of additional threat data stored on the secured database each participant wishes to be notified about, and said plurality of sources comprises said participants, vendors and government sources.

16. The system of claim 10 wherein said threat data is comprised of and arranged in the database as, (a) incident data, (b) vulnerability data, (c) threat activity data, and (d) vendor data, and further comprising incident resolution data separately arranged in the database.

17. The system of claim 16 further comprising, for additional threat data anonymously submitted by participants, a mechanism for authenticating the additional threat data.

18. The system of claim 16 wherein said additional threat data is classified as one of crisis threat data, urgent threat data, and awareness threat data, and wherein said electronic notification system is configured for notifying participants in the event crisis threat data or urgent threat data is added to the secured database as additional threat data.

19. The system of claim 18 wherein said electronic notification system is configured for notifying said participants through at least one of pager, electronic mail and digital phone messaging.

* * * * *